July 15, 1947. H. E. ETTER 2,423,931
APPARATUS FOR GENERATING SWEEP VOLTAGES
Filed April 26, 1944

INVENTOR.
HOWARD E. ETTER
BY
ATTORNEY.

Patented July 15, 1947

2,423,931

UNITED STATES PATENT OFFICE 2,423,931

APPARATUS FOR GENERATING SWEEP VOLTAGES

Howard E. Etter, Salem, Mass., assignor to Radio Corporation of America, a corporation of Delaware Application April 26, 1944, Serial No. 532,797

7 Claims. (Cl. 250—36)

The present invention relates to apparatus for generating sweep voltages, and more particularly to apparatus for providing voltages, currents, or either, of special wave form useful in the operation of a cathode ray tube employed in television systems or as a cathode ray oscillograph.

The primary object of the invention is to produce a single linear sweep voltage or current of large value and substantially constant amplitude over a wide range of repetition rates and sweep speeds. In accordance with the invention, operation to produce beam deflecting voltages, currents, or either, may be obtained under control of an impressed wave from an individual source, or the sweep voltages and/or currents may be obtained at a rate determined by the circuit constants of the apparatus constituting the invention.

Another object is to provide a novel generator of voltage waves.

A further object is to provide a novel generator of pulses or waves of predetermined form.

Still another object is to provide a novel energizing arrangement for a cathode ray oscillograph whereby only the linear sweep of the beam across the luminescent screen is visible so that the wave form of pulses and other transients may be observed as well as periodic waves.

A still further object is to provide an electric wave generator comprising electronic apparatus in which a multi-element vacuum tube serves as a cathode impedance in conjunction with a separate anode impedance, the latter serving to provide feedback to another vacuum tube.

Other and more specific objects of the invention will become apparent from a consideration of the following specification and claims in connection with the accompanying drawings illustrating preferred forms of the invention by way of example, in which:

Figure 1:
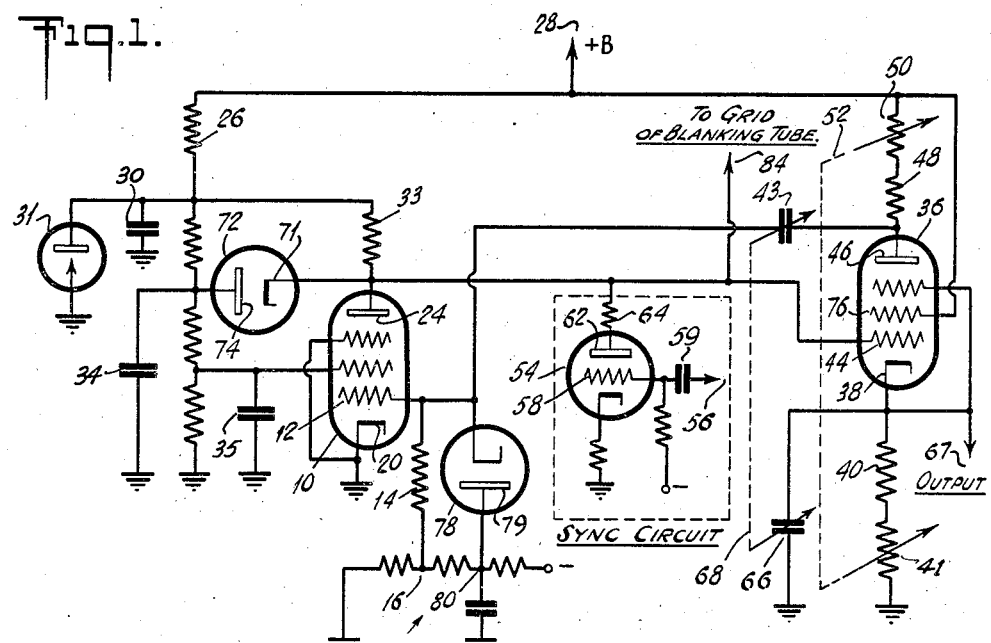
Fig. 1 shows schematically a sweep or deflection generator embodying the present invention.

Referring now to the drawings and more particularly to Fig. 1 thereof, a vacuum tube 10 is connected in such a manner that it is normally biased beyond cut off. The signal grid 12 of this tube is connected through the usual grid resistor 14 to a point 16 on a potentiometer 18 which is at a negative potential with respect to the point of connection of the cathode 20. Anode 24 of the tube 10 is connected through a dropping resistor 26 to a source of positive potential 28. A gas discharge tube 31 maintains a substantially constant voltage at the end of the dropping resistor 26, and a resistor 33 serves as a load resistor for the anode 24 of the tube 10. Condensers 30, 34, and 35 tend to keep the voltage constant.

A vacuum tube 36 is connected so that it is normally conducting with its cathode 38 connected to ground through a series combination of resistors 40 and 41. The resistor 41 is of the variable type so that a fine degree of control may be exercised over the total resistance in the cathode circuit. The purpose of this will be later described. The control electrode 44 of the tube 36 is connected to the anode 24 of the tube 10 so that, since the latter is normally cut off, the potential on the control electrode 44 will be substantially that set by the voltage regulator tube 31. The anode 46 of the tube 36 is connected to the source of positive anode potential 28 by way of a resistor 47 and an adjustable resistor 50. A common means for adjusting the resistor 50 in conjunction with the resistor 41 is indicated by reference character 52. The tube 36 is normally conductive because of the relative high positive potential on its grid.

The apparatus of Fig. 1 is in a stable condition when the tube 10 is non-conducting and the tube 36 is conducting. This stable condition is maintained until the apparatus is actuated by an external signal applied to a terminal 56. The external signal is applied in a positive sense to the grid 58 of a tube 54 by way of a conventional coupling condenser 59.

The anode 62 of the tube 54 is connected to the anode 24 of the tube 10 and the grid 44 of the tube 36 by way of a plate load resistor 64. This resistor is used only to limit the plate current of tube 54, and when certain types of tubes are selected for this purpose, it may be omitted.

The linear output voltage of saw tooth wave form, generated by the apparatus of Fig. 1, is taken across the resistors 40 and 41 which are shunted by an adjustable capacitance 66. The output terminal is indicated at 67. The adjustable capacitance 66 is operated simultaneously with the adjustable capacitance 43 by any suitable mechanical operating means indicated by reference character 68.

Operation of the apparatus of Fig. 1 when a control signal pulse is applied to the terminal 56 will now be described. In general, where the apparatus of Fig. 1 is employed as a time axis or sweep circuit generator for a cathode ray oscillograph (not shown), the pulse which is applied to the terminal 56 will be obtained from the vertical amplifier and therefore is synchronized with the voltage which is under observation by the oscillograph, or the terminal 56 may be driven from an external voltage which precedes the voltage under observation.

Where the apparatus of Fig. 1 is to be employed to provide deflection voltages for a transmitting or receiving television cathode ray tube, the pulse which is applied to the terminal 56 will be obtained in any known manner, for example from a sync generator, usually present in television scanning equipment for transmitting or receiving.

When a sync pulse is applied to the terminal 56, the potential at the grid 44 is lowered (that is, made more negative). The voltage at the cathode 38 will not fall as rapidly as the voltage on the grid 44 because of the presence of the condenser 66. The plate current of the tube 36 decreases since the grid voltage falls faster than the cathode voltage. The plate 46 therefore goes more positive. The positive potential at the plate 46 is applied to the grid 12 of the tube 10 by way of the coupling condenser 43. The grid 44 then becomes still more negative due to conductivity within tube 10. This regenerative cycle continues with the voltage on the grid 44 continuing to decrease rapidly until the cathode 71 of a diode 72 becomes more negative than its anode 74. During this time the condenser 66 is discharging inasmuch as the potential at the cathode 38 is not falling as rapidly as the potential at the grid 44. When the cathode 71 of the diode 72 becomes more negative than its anode 74, this diode conducts and the anode 24 of tube 10 does not go more negative.

Discharge of the condenser 66 continues, however, even after the diode 72 becomes conducting until the cathode 38 of the tube 36 approaches the same voltage as its grid 44. In effect, the limiting negative voltage on grid 44 is determined by the diode 72, and the voltage at the cathode 38 continues to decrease over the portion of the discharge curve which is substantially linear until it reaches a voltage value corresponding to the voltage value existing on the grid 44 when the diode 72 becomes conductive. During the discharge of the condenser 66, it will be understood that a saw tooth wave of voltage appears at the terminal 67 which is useful for the applications referred to above and others which will readily occur to those skilled in the art.

At the end of the generation of the saw tooth wave voltage just referred to, the voltage on the cathode 38 is substantially equal to the voltage on the grid 44. As soon as the value of the grid voltage with respect to the cathode voltage is less than that of cut off, plate current starts to flow in the tube 36. The flow of plate current makes the plate 46 more negative than it was at the end of the generation of the saw tooth wave of voltage. The grid 12 of the tube 10 then is made more negative, and the voltage at the plate 24 increases (becomes more positive), thus continuing the restoration of the apparatus of Fig. 1 to its normal or initial stable state. The restoration process just explained is regenerative and ends with the tube 10 biased beyond cut off and also with grid 44 positive with respect to the cathode 38.

Since the total value of the resistors 48 and 50 must be high to give the effect of a voltage change at the grid 12 of the tube 10 and adequate regeneration, the plate current of the tube 36 is low. However, the screen electrode 76 of the tube 36 has no dropping resistor and therefore the screen current for the tube is very high. The sum of the plate current and the screen current charges the condenser 66 very rapidly and this causes the cathode 38 to go positive very rapidly. This process continues until the initial quiescent condition is attained.

At the end of the latter part of the discharge cycle of the condenser 66, the grid 12 of the tube 10 is positive and grid current will flow. A diode 78 permits the voltage on the grid 12 to return to the value which is present at the beginning of the discharge cycle which corresponds to the normal quiescent condition of the apparatus. The diode 78 conducts during the restoration cycle at which time the grid 12 of the tube 10 is very negative with respect to the cathode 20. The voltage on the plate 79 of the diode 78 is adjusted so that its conduction counteracts the grid current of the tube 10 during the discharge cycle of the condenser 66.

In the discharge of the condenser 66 only a relatively small percentage of the total voltage is used resulting in a substantially linear voltage versus time variation. The adjustable resistor 41 provides a fine adjustment. The condenser 66 provides a coarse control. The adjustable resistor 50 is varied with the adjustable resistor 41 to keep the voltage fed back to the tube 10 more nearly constant. The condenser 43 is changed with the condenser 66 to keep the $C_{43}R_{14}$ time constant within the best operating range.

The apparatus of Fig. 1, which has just been described, is especially useful because of its short return time which may be as low as 1 microsecond; and also because of the high frequency at which it will operate. For example, it may be operated at 100 kc. to produce a saw tooth wave which is less than 10 micro-seconds per single sweep. It starts in less than .2 microseconds for a pulse and will synchronize with a 5 megacycle signal.

A suitable voltage may be taken from a terminal 84 which is connected to the control grid 44 of the tube 36 to feed the grid of a tube for intensifying the spot on a cathode ray tube so that only the linear sweep of the beam across the screen is visible when the apparatus of Fig. 1 is used as the horizontal deflection oscillator of the cathode ray oscillograph.

Figure 2:
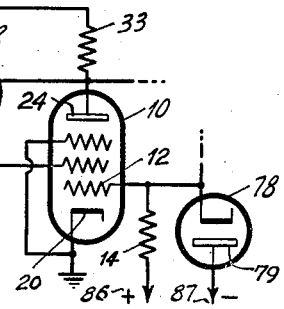
Fig. 2 shows a modification of the arrangement of Fig. 1 to provide a self-operating sweep circuit generator.

Fig. 2 of the drawings shows a slight modification of the apparatus of Fig. 1 which consists in alterating the bias voltages applied to points 16 and 80 (Fig. 1). In Fig. 1, for example, the point 16 may be 6.5 to 8.5 volts negative, and the point 80 may be 44 volts negative. In the arrangement of Fig. 2, the point 86 is 100 volts positive, and the point 87 is .8 volt negative. It will be understood that these values are given solely for the purpose of explaining the difference in connection between the two figures of the drawing, and they are not intended as critical or limiting values since it will be obvious that the best values of biasing voltages will be determined by the type of tube chosen for each position in the apparatus and the values of associated resistors and capacitors. With the circuit connected as shown in Fig. 2, it is unstable and oscillates. The operation is the same as for the single sweep circuit described above in connection with Fig. 1 except that the control grid 12 of the tube 10 does not go as negative because of the presence of the diode 78, and it cannot stay negative because the resistor 14 is returned to a positive voltage.

The tube 36 is periodically biased beyond cut off and remains thus while the condenser 66 is discharging through the resistors 40 and 41. The condenser 66 is charged through the tube 36 while the discharge of the condenser 43 is decreasing the current in the tube 10. Synchronization with an external signal is effected while the control grid 44 of the tube 36 is negative. The output voltage appearing across the condenser 66 is a very good saw tooth, whose shape changes very little with repetition rate or synchronizing voltage.

It will be understood that some type of switching arrangement may be employed if desired to change the connection of the points 16 and 80 illustrated in Fig. 1 to the arrangement shown in Fig. 2 so that the equipment may be used either as a single sweep or self-repeating generator.

Figure 3:
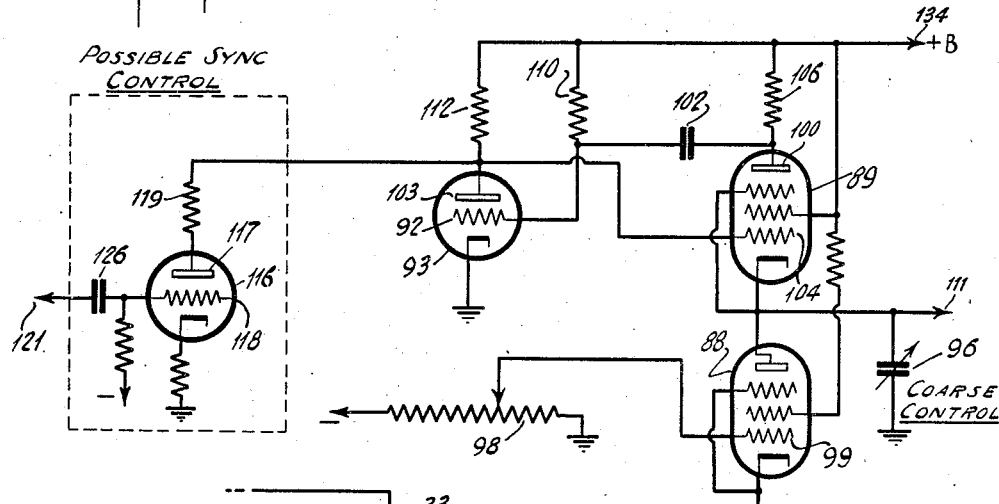
Fig. 3 is a diagrammatic showing of a modified form of sweep generator embodying the invention.

Referring to Fig. 3 of the drawings, a modification of the apparatus of Fig. 1 is shown which employs a pentode tube 88 as the cathode follower resistor. The use of a pentode in place of the resistance of the resistors 40 and 41 increases the linearity of discharge. In other words, the discharge is not exponential at all, and a much greater amplitude of the condenser discharge period may be used. A pentode may be used in Fig. 1 or Fig. 2 to serve as a cathode resistor for the tube 36 with no other change than some slight bias change.

In Fig. 3 the apparatus has no stable state and thus oscillates. A tube 89 corresponds in function to the tube 36 of Fig. 1. A tube 93 serves a purpose similar to that of the tube 10 of Fig. 1. At some instant the control grid 104 of the tube 89 is beyond cut off, and the tube 93 is drawing current with its control grid 92 slightly positive. The condenser 96 is discharging through the tube 88 at a rate depending on the setting of a potentiometer 98 which provides a bias for the control grid 99 of the tube 88. This discharge of the condenser 96 is at a linear rate since the tube 88 is a pentode.

After due time, the tube 89, when its cathode falls to cut off again, becomes conducting. The anode 100 of the tube 89 goes less positive and causes the control grid 92 of the tube 93 to go negative by means of a coupling capacitor 102. The anode 103 of the tube 93 and the control grid 104 of the tube 89 therefore go positive causing the anode 100 of the tube 89 to go still less positive.

This action is repeated very rapidly, and the condenser 96 is charged quickly through the tube 89. As the condenser 96 becomes charged, the voltage across a resistor 106 holding the tube 93 beyond cut off decreases, aided slightly by the condenser 102 discharging through a resistor 110. The tube 93 returns to its original conducting state, again returning the control grid 104 of the tube 89 beyond cut off, completing the cycle. The output which appears across the condenser 96 is taken from a terminal 111.

The apparatus of Fig. 3 may be synchronized with another signal applied to a terminal 121, synchronization occurring as the tube 89 returns to cut off. The anode 117 of a synchronizing control tube 116 is connected to the grid 104 of the tube 89 by way of a plate load resistor 119. The external signal applied to the terminal 121 is transmitted through a coupling condenser 126 to the grid 118 of the tube 116.

The potentiometer 98 provides a fine control of the frequency, and the condenser 96 is the coarse control. The resistor 110 is made large enough to keep the tube 93 from drawing excessive grid current. The condenser 102 is made large enough so that it does not interfere with the charging of the condenser 96, by becoming discharged through the resistor 110. This permits the condenser 96 to have a large value. The resistor 106 is made just large enough to allow the condenser 96 to attain about a 95 per cent charge. The resistor 112 determines the output voltage, the largest value usable depending on the fastest return time desired. The condenser 102 and the resistor 106 may be changed if the most rapid return time is desired.

Solely by way of example, a possible tube combination for Fig. 1 is to use a VR 150-30 for the tube 31, a 6SH7 for the tube 10, a 6AC7 for the tube 36, and a single 6H6 for the diodes 72 and 78. A possible tube combination for Fig. 3 is to use a 6SN7 for the tube 93 employing the other half of this tube in place of a separate tube 116, a 6AC7 for the tube 89, and a 6SK7 for the tube 88. The connection for the positive terminal of the anode supply source is indicated at 134.

The arrangement of Fig. 3, which has just been described, is useful because of its linearity, high output voltage, rapid return time, and ability to work at very high frequencies. It is especially useful as a saw tooth oscillator for a cathode ray oscillograph.

Having now described the invention, what is claimed and desired to be secured by Letters Patent is the following:

1. In an electric wave generator, means including an adjustable anode resistor for applying a positive operating voltage to the anode of a vacuum tube, adjustable impedance means for connecting the cathode of the same vacuum tube to its anode return circuit, a capacitance in shunt to said impedance means, an electric wave output connection located with respect to said impedance means to be substantially at the cathode potential, a feedback connection from said anode resistor terminating in means for applying an alternating current feedback voltage to the grid of another vacuum tube, a connection for applying a positive potential to the anode of said other vacuum tube, a connection from said potential applying means including means for applying a voltage representative of the anode potential of said second vacuum tube to a control electrode in the first vacuum tube, and means operative simultaneously to adjust said adjustable anode resistor and said adjustable impedance means.

2. In an electric wave generator, means including an anode resistor for applying a positive operating voltage to the anode of a vacuum tube, impedance means for connecting the cathode of the same vacuum tube to its anode return circuit, an adjustable capacitance in shunt to said impedance means, an electric wave output connection located with respect to said impedance means to be substantially at the cathode potential, a feedback connection from said anode resistor terminating in adjustable means for applying an alternating current feedback voltage to the grid of another vacuum tube, a connection for applying a positive potential to the anode of said other vacuum tube, a connection from said potential applying means including means for applying a voltage representative of the anode potential of said second vacuum tube to a control electrode in the first vacuum tube, and means operative simultaneously to adjust said adjustable capacitance and said adjustable means for applying an alternating current feedback voltage.

3. In an electric wave generator, means including an adjustable anode resistor for applying a positive operating voltage to the anode of the vacuum tube, adjustable impedance means for connecting the cathode of the same vacuum tube to its anode return circuit, an adjustable capacitance in shunt to said impedance means, an electric wave output connection located with respect to said impedance means to be substantially at the cathode potential, a feedback connection from said anode resistor terminating in adjustable means for applying an alternating current feedback voltage to the grid of another vacuum tube, a connection for applying a positive potential to the anode of said other vacuum tube, a connection from said potential applying means including means for applying a voltage representative of the anode potential of said second vacuum tube to a control electrode in the first vacuum tube, means operative simultaneously to adjust said adjustable capacitance and said adjustable means for applying an alternating current feedback voltage, and means operative simultaneously to adjust said adjustable anode resistor and said adjustable impedance means.

4. An electric wave generator comprising two electron discharge tubes each having an anode, a cathode, and a control electrode, a direct current connection from the control electrode of a first tube to the anode of the second tube, a condenser connecting the anode of the first tube to the control electrode of the second tube, anode load means connected in each of the anode circuits of said tubes, a resistor and biasing means connected between the control electrode and cathode of said second tube, and a diode tube having a cathode and an anode, the cathode of said diode being connected to said control electrode of said second tube, and additional biasing means connected to the anode of said diode.

5. An electric wave generator comprising two electron discharge tubes each having an anode, a cathode, and a control electrode, a direct current connection from the control electrode of a first tube to the anode of the second tube, a condenser connecting the anode of the first tube to the control electrode of the second tube, anode load means connected in each of the anode circuits of said tubes, and a diode tube having a cathode and an anode, the cathode of said diode being connected to the anode of said second tube, the anode of said diode being connected to a resistor, and said diode and resistor being connected to shunt said anode load means when said diode becomes conductive.

6. An oscillator for producing a saw tooth wave form comprising a pair of electron discharge devices each of which includes a cathode, a control electrode, and an anode, means including anode resistances for maintaining said anodes positive with respect to said cathodes, means for connecting the anode of each discharge device to the control electrode of the other discharge device, a resistance, means for connecting one end of said resistance to the control electrode of one of said tubes, means for maintaining the other end of said resistance negative with respect to the corresponding tube cathode, and a diode having a cathode and an anode, said diode cathode being connected to said control electrode which is connected to said resistance, and the anode of said diode being connected to a source of biasing potential.

7. An electric wave generator comprising two electron discharge tubes each having an anode, a cathode, and a control electrode, a connection from the control electrode of said first tube to the anode of said second tube, a condenser connecting the anode of said first tube to the control electrode of said second tube, a resistor connected between the control electrode and cathode of said second tube, a diode connected in shunt to said last named resistor with its cathode connected to said control electrode, a resistor in the anode circuit of said second tube, and a second diode connected to said anode of said second tube, said diode having a cathode and an anode, the cathode of said second diode being connected to the anode of said second tube, the anode of said second diode being connected to said anode resistor at a point electrically displaced from the anode of said tube for limiting the voltage applied at the control grid of said first tube.

HOWARD E. ETTER.

REFERENCES CITED

The following references are of record in the file of this patent:

UNITED STATES PATENTS

| Number | Name | Date |
|---|---|---|
| 2,052,184 | Lewis | Aug. 25, 1936 |
| 2,114,938 | Puckle | Apr. 19, 1938 |
| 2,183,966 | Lewis | Dec. 19, 1939 |
| 2,207,511 | Geiger | July 9, 1940 |
| 2,241,256 | Gould | May 6, 1941 |
| 2,363,810 | Schrader et al. | Nov. 28, 1941 |
| 2,375,709 | Thompson | May 8, 1945 |
| 2,262,838 | Deloraine et al. | Nov. 18, 1941 |
| 2,266,526 | White | Dec. 16, 1941 |

OTHER REFERENCES

"Electronics," page 28, August 1938.